(12) United States Patent
Arel

(10) Patent No.: US 6,769,874 B2
(45) Date of Patent: Aug. 3, 2004

(54) PERMANENT MAGNET ALTERNATOR FOR A GAS TURBINE ENGINE

(75) Inventor: David Arel, Granby, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 130 days.

(21) Appl. No.: 10/098,804

(22) Filed: Mar. 15, 2002

(65) Prior Publication Data

US 2004/0080234 A1 Apr. 29, 2004

(51) Int. Cl.$^7$ .............................................. F03D 11/02
(52) U.S. Cl. ........................................ 416/95; 416/60
(58) Field of Search ............................. 416/95, 60, 68, 416/124.1, 126, 128, 170 R, 142, 245 R; 310/95, 154.01, 154.02, 168

(56) References Cited

U.S. PATENT DOCUMENTS

| | | | | |
|---|---|---|---|---|
| 4,431,931 A | * | 2/1984 | Perrier et al. ................. | 310/61 |
| 4,658,346 A | * | 4/1987 | Templeton .................. | 363/160 |
| 4,704,571 A | * | 11/1987 | Rosenberg ................... | 322/29 |
| 5,479,060 A | | 12/1995 | Giamati et al. | |
| 5,634,800 A | | 6/1997 | Giamati | |
| 5,709,532 A | | 1/1998 | Giamati et al. | |
| 5,767,605 A | | 6/1998 | Giamati | |
| RE36,101 E | * | 2/1999 | Andress et al. ............. | 415/229 |
| 6,047,104 A | * | 4/2000 | Cheng ......................... | 388/835 |
| 6,093,986 A | * | 7/2000 | Windhorn ................. | 310/68 B |
| 6,127,758 A | * | 10/2000 | Murry et al. ................ | 310/168 |
| 6,137,082 A | * | 10/2000 | Pruden et al. ............... | 219/201 |
| 6,137,187 A | * | 10/2000 | Mikhail et al. ................ | 290/44 |
| 6,158,960 A | | 12/2000 | Marsi | |
| 6,264,138 B1 | | 7/2001 | Hawkins | |
| 6,503,056 B2 | * | 1/2003 | Eccles et al. .................. | 416/95 |

FOREIGN PATENT DOCUMENTS

| | | |
|---|---|---|
| FR | 950666 | 10/1949 |
| FR | 2465352 | 3/1981 |

OTHER PUBLICATIONS

International Search Report Dated Aug. 13, 2003.

\* cited by examiner

Primary Examiner—Edward K. Look
Assistant Examiner—James M McAleenan
(74) Attorney, Agent, or Firm—Carlson, Gaskey & Olds, P.C.

(57) ABSTRACT

A permanent magnet alternator (PMA) includes a stator which rotates with a propeller shaft and a rotor which is mounted within the stator and rotates with a gas turbine engine output shaft. The rotor is driven at the relatively high speed of the turbine output shaft while the stator is driven at a relatively slow speed of the propeller shaft as reduced by an in-line gearbox. The great difference in speed between the propeller shaft and the turbine output shaft results in a compact PMA which provides significant electrical power output. As the stator of the PMA rotates with the propeller shaft, power is supplied directly to the rotating hub and blades without the heretofore necessary slip ring and associated electrical transmission components.

15 Claims, 3 Drawing Sheets

PERMANENT MAGNET ALTERNATOR FOR A GAS TURBINE ENGINE

BACKGROUND OF THE INVENTION

The present invention relates to a power generator, and more particularly a generator which provides power to a rotating field of a propeller.

The hazards of aircraft flight in atmospheric icing conditions are well known. Various techniques are known for removing or preventing ice accumulation encountered during flight. Certain of the techniques are particularly adapted to protect specific parts of an aircraft. An electrothermal propeller de-icing system is an example of a specialized system.

In one electrothermal propeller de-icing system, electrothermal de-icers are bonded to the leading edge portions of each propeller blade. An engine driven alternator is mounted in the stationary field to generate electrical power for the de-icing system. Electrical power from the alternator is conducted to the rotational field of the rotating propeller and hub assembly through a sliding contact typically including a slip ring and brush assembly. Although effective, conducting energy from the stationary field to the rotational field maybe relatively weight and maintenance intensive.

In another propeller de-icing system, a generator is arranged in an annular ring about the rotating propeller shaft and is driven thereby. Disadvantageously, the generator is relatively large and heavy as it is powered by the relatively slow rotation of the propeller shaft.

In addition to providing significant electrical power for the de-icing system, advanced propeller control and actuation requires still more electrical power in the rotational field of the propeller for propeller blade actuation and control. Such significant quantities of electrical power may not be achieved by conventional generators within the limited packaging constraints of an aircraft environment.

Accordingly, it is desirable to provide large quantities of electrical power directly to a rotational field of an aircraft propeller system without complicated, heavy and maintenance intensive rotating couplings.

SUMMARY OF THE INVENTION

The permanent magnet alternator (PMA) according to the present invention is located within a propeller shaft. The PMA includes a stator mounted to the propeller shaft such that the stator rotates with the propeller shaft and a rotor which is mounted within the stator and is driven directly by a turbine output shaft. The rotor is thereby driven at the relatively high speed of the turbine output shaft while the stator is driven at a relatively slow speed of the propeller shaft as reduced by an in-line gearbox. The great difference in speed between the propeller shaft and the turbine output shaft results in a relatively compact PMA which provides a significant power output. Moreover, as the propeller shaft and the turbine output shaft preferably rotate in opposite directions, the PMA rotational speed is the sum of the propeller shaft and turbine output shaft further increasing power output.

As the stator of the PMA rotates with the propeller shaft, power is supplied directly to a multiple of propeller blades through a power lead. The power lead rotates with the stator and propeller shaft to provide power directly to the rotating hub and blades. The heretofore necessary slip ring and associated electrical transmission components which transfer power generated within the stationary field of the engine to the rotating field of the propeller are eliminated.

The present invention therefore provides large quantities of electrical power directly to a rotational field of a propeller system without complicated, heavy and maintenance intensive rotational couplings.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
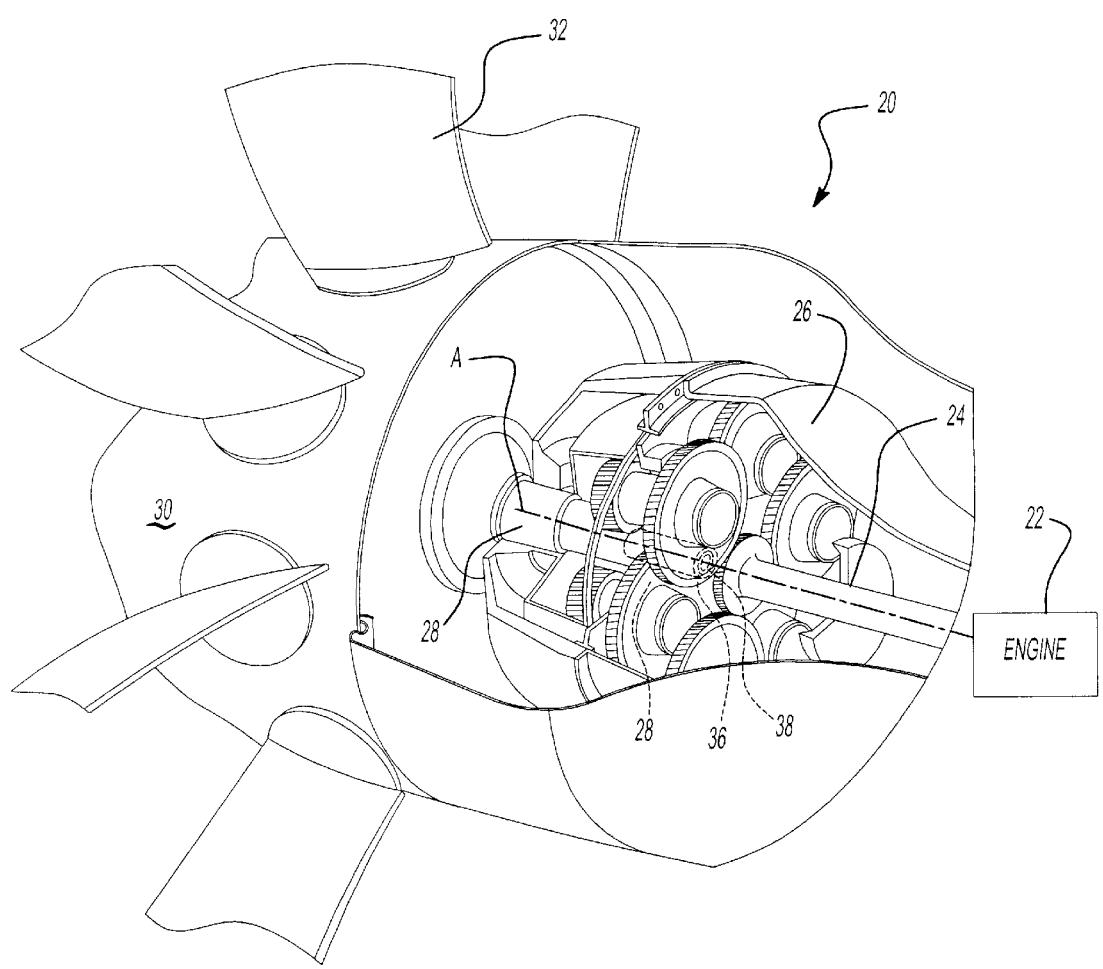
FIG. 1 is a general perspective view an exemplary gas turbine turboprop engine embodiment for use with the present invention.

FIG. 1 illustrates a general perspective view of a turboprop system 20 including a gas turbine engine (illustrated schematically at 22) which rotates a turbine output shaft 24 at a high speed. The turbine output shaft 24 drives a gear reduction gearbox (illustrated somewhat schematically at 26) which decrease shaft rotation speed and increase output torque. The gearbox 26 drives a propeller shaft 28 which rotates a propeller hub 30 and a plurality of propeller blades 32 which extend therefrom. Typically, the turbine output shaft 24 rotates in one direction while the propeller shaft 28 rotates in an opposite direction. Preferably, the turbine output shaft 24 and the propeller shaft 28 rotate about a common axis A. It should be understood that although the present invention is described with reference to a gas turbine turboprop engine, any in-line rotational system which generates a relative speed difference will benefit from the present invention. Axis A is substantially perpendicular to a plane P which is defined by the propeller blades 32. Located substantially between the turbine output shaft 24 and the propeller shaft 28 is a permanent magnet alternator (PMA) 34 which rotates about axis A to provide electrical power directly to the rotating propeller hub 30 and blades 32.

Figure 2:
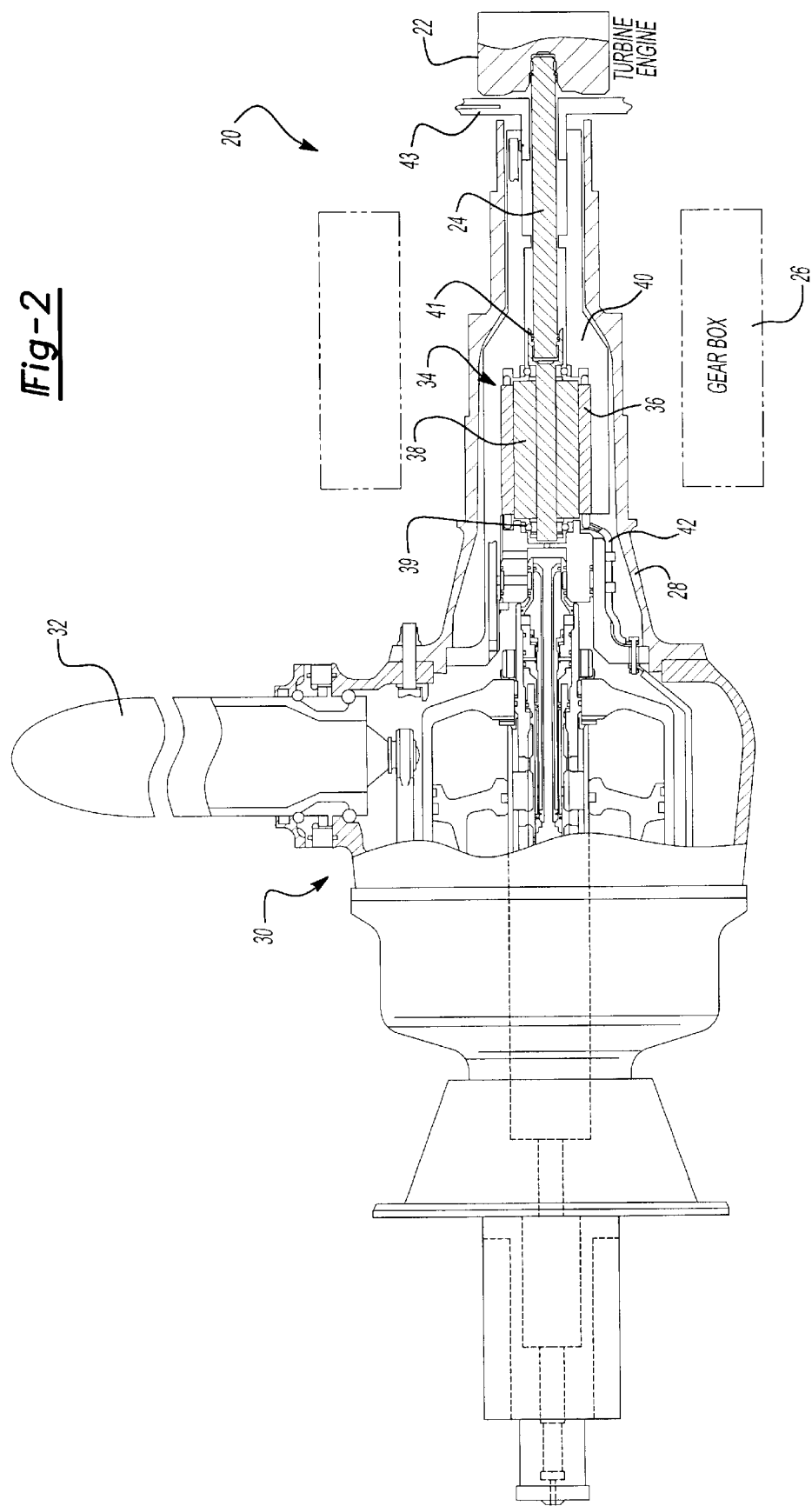
FIG. 2 is a sectional view of gas turbine turboprop engine illustrated in FIG. 1.

Referring to FIG. 2, a sectional view of the gas turbine turboprop engine 20. Preferably, the PMA 34 is located within the propeller shaft 28. The PMA 34 includes a stator 36 and rotor 38. It should be understood that the shafts 24, 28 and the PMA 34 are appropriately supported by bearings 39 as generally known.

The stator 36 is mounted to the propeller shaft 32 through a housing 40 such that the stator rotates with the propeller shaft 28. A coupling (illustrated somewhat schematically at 41) interconnects the rotor 38 and output shaft 24. A transfer bearing (illustrated schematically at 43) preferably mounts to housing 40 to rotatably support the propeller shaft 28. The rotor 38 is mounted within the stator 36 and is driven directly by the turbine output shaft 24.

The rotor 38 is driven at the relatively high speed of the turbine output shaft 24. The stator 36 is driven at a relatively slow speed of the propeller shaft 28 as reduced by the gearbox 26. The great difference in speed between the propeller shaft 32 and the turbine output shaft 28 results in a relatively compact PMA 34 which provides a significant power output. Moreover, as the propeller shaft 28 and the turbine output shaft 24 preferably rotate in opposite directions, the PMA 34 rotational speed is the sum of the propeller shaft 28 and turbine output shaft 24 further increasing power output.

Further, because the stator 36 of the PMA 34 rotates with the propeller shaft 28, power may be directly supplied to the blades 32 through a power lead 42. The power lead 42 rotates with the stator 28 and propeller shaft 32 to provide power directly to the rotating hub 30 and blades 32. It should be understood that although a particular lead arrangement is illustrated in the disclosed embodiment other lead paths and arrangements will benefit from the present invention.

Figure 3:
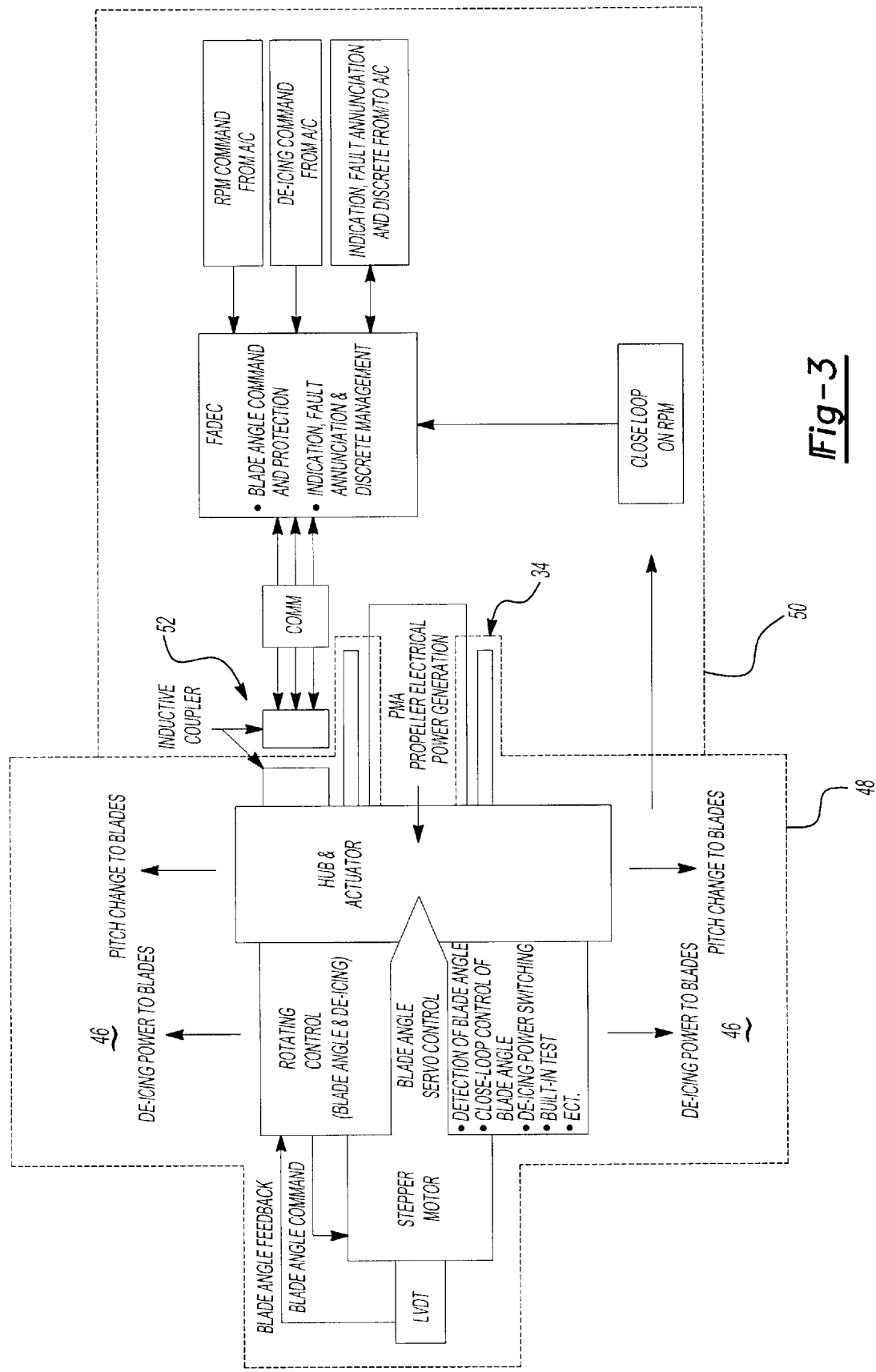
FIG. 3 is a schematic block diagram of an electrical power system for use with the present invention.

Referring to FIG. 3, a schematic diagram of one electrical system 44 for a turboprop system 20 (FIG. 1) according to the present invention is illustrated. The PMA 34 provides electrical power for a deicing system 46 (FIG. 2) and other electrical actuators and controls within the rotational field 48. The heretofore necessary slip ring and associated electrical power transmission components which transfer power generated within the stationary field of the engine to the rotating field of the propeller are eliminated. In addition, advance propeller control and actuation requires significant electrical power in the rotational field 48 of the propeller for propeller blade actuation and control. The present invention generates the significant power to operate such controllers and actuators within the rotational field 48. Only the relatively low-power control signals from a stationary field 50 need be transferred through a rotational inductive coupling (illustrated schematically at 52). Reliability is therefore greatly increased.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A turboprop system comprising:
   a propeller shaft which rotates about a first axis, said propeller shaft rotatable at a first speed to drive a propeller hub and a plurality of propeller blades extending therefrom;
   a stator mounted within said propeller shaft for rotation therewith;
   an output shaft which rotates about said first axis, said output shaft rotatable at a second speed different from said first speed; and
   a rotor mounted to said output shaft for rotation with said output shaft, said rotor mounted within said propeller shaft.

2. The turboprop system as recited in claim 1, further comprising a power lead which communicates electricity from said stator to each of said propeller blades.

3. The turboprop system as recited in claim 2, wherein said power lead communicates electricity to a de-icing system.

4. The turboprop system as recited in claim 1, wherein said output shaft is driven by a gas turbine engine output shaft.

5. The turboprop system as recited in claim 1, further comprising a gear reduction gearbox driven by said output shaft, said gear reduction gearbox driving said propeller shaft.

6. The turboprop system as recited in claim 1, wherein said gear reduction gearbox substantially surrounds said propeller shaft.

7. The turboprop system as recited in claim 1, wherein said propeller shaft rotates in a direction opposite said output shaft.

8. The turboprop system as recited in claim 1, further comprising a housing mounted within said propeller shaft, said stator mounted within housing.

9. The turboprop system as recited in claim 1, wherein said output shaft is mounted within said propeller shaft.

10. A turboprop system comprising:
    a gas turbine engine;
    a turbine output shaft driven by said gas turbine engine about a first axis at a first speed;
    a gear reduction gearbox driven by said turbine output shaft;
    a propeller shaft driven about said first axis by said gear reduction gear box, said propeller shaft rotatable at a second speed different than said first speed;
    a propeller hub and a plurality of propeller blades driven by said propeller shaft;
    a stator mounted within said propeller shaft for rotation therewith;
    a rotor mounted to said turbine output shaft for rotation with said turbine output shaft about said first axis, said rotor mounted within said propeller shaft.

11. The turboprop system as recited in claim 10, wherein said gear reduction gearbox substantially surrounds said propeller shaft.

12. The turboprop system as recited in claim 10, wherein said propeller shaft rotates in a direction opposite said turbine output shaft.

13. The turboprop system as recited in claim 10, further comprising a housing mounted within said propeller shaft, said stator mounted within housing.

14. The turboprop system as recited in claim 10, further comprising a housing mounted within said propeller shaft, said stator mounted within housing.

15. The turboprop system as recited in claim 10, wherein said output shaft is mounted within said propeller shaft.

\* \* \* \* \*